(12) United States Patent
Rust et al.

(10) Patent No.: US 6,546,459 B2
(45) Date of Patent: Apr. 8, 2003

(54) REDUNDANT DATA STORAGE SYSTEMS AND METHODS OF OPERATING A REDUNDANT DATA STORAGE SYSTEM

(75) Inventors: Robert A. Rust, Boise, ID (US); Barry J Oldfield, Boise, ID (US); Christopher W Johansson, Horseshoe Bend, ID (US); Christine Grund, Meridian, ID (US)

(73) Assignee: Hewlett Packard Development Company, L. P., Houston, TX (US)

( * ) Notice: Subject to any disclaimer, the term of this patent is extended or adjusted under 35 U.S.C. 154(b) by 201 days.

(21) Appl. No.: 09/809,972

(22) Filed: Mar. 15, 2001

(65) Prior Publication Data

US 2002/0133670 A1 Sep. 19, 2002

(51) Int. Cl.[7] ............................................... G06F 12/00
(52) U.S. Cl. .......................... 711/114; 710/39; 710/40; 711/158; 711/162; 714/6
(58) Field of Search ..................... 710/39, 40; 711/114, 711/162, 158; 714/6

(56) References Cited

U.S. PATENT DOCUMENTS

| | | | | |
|---|---|---|---|---|
| 5,905,876 A | * | 5/1999 | Pawlowski et al. | 710/112 |
| 6,230,240 B1 | * | 5/2001 | Shrader et al. | 711/114 |
| 6,282,610 B1 | * | 8/2001 | Bergsten | 711/114 |
| 6,301,643 B1 | * | 10/2001 | Crockett et al. | 711/162 |

* cited by examiner

Primary Examiner—Hiep T. Nguyen

(57) ABSTRACT

Redundant data storage systems and methods of operating a redundant data storage system are presented. In one aspect of the invention, a redundant data storage system includes: a plurality of storage devices configured to redundantly store digital data; a plurality of transaction originating devices configured to originate a plurality of transactions to control operations of the storage devices; a plurality of parallel data buses configured to communicate data relative to the respective transaction originating devices; and a plurality of transaction processing devices coupled with the parallel data buses and configured to process the transactions in an order according to a transaction ordering protocol common to at least some of the transaction processing devices.

20 Claims, 3 Drawing Sheets

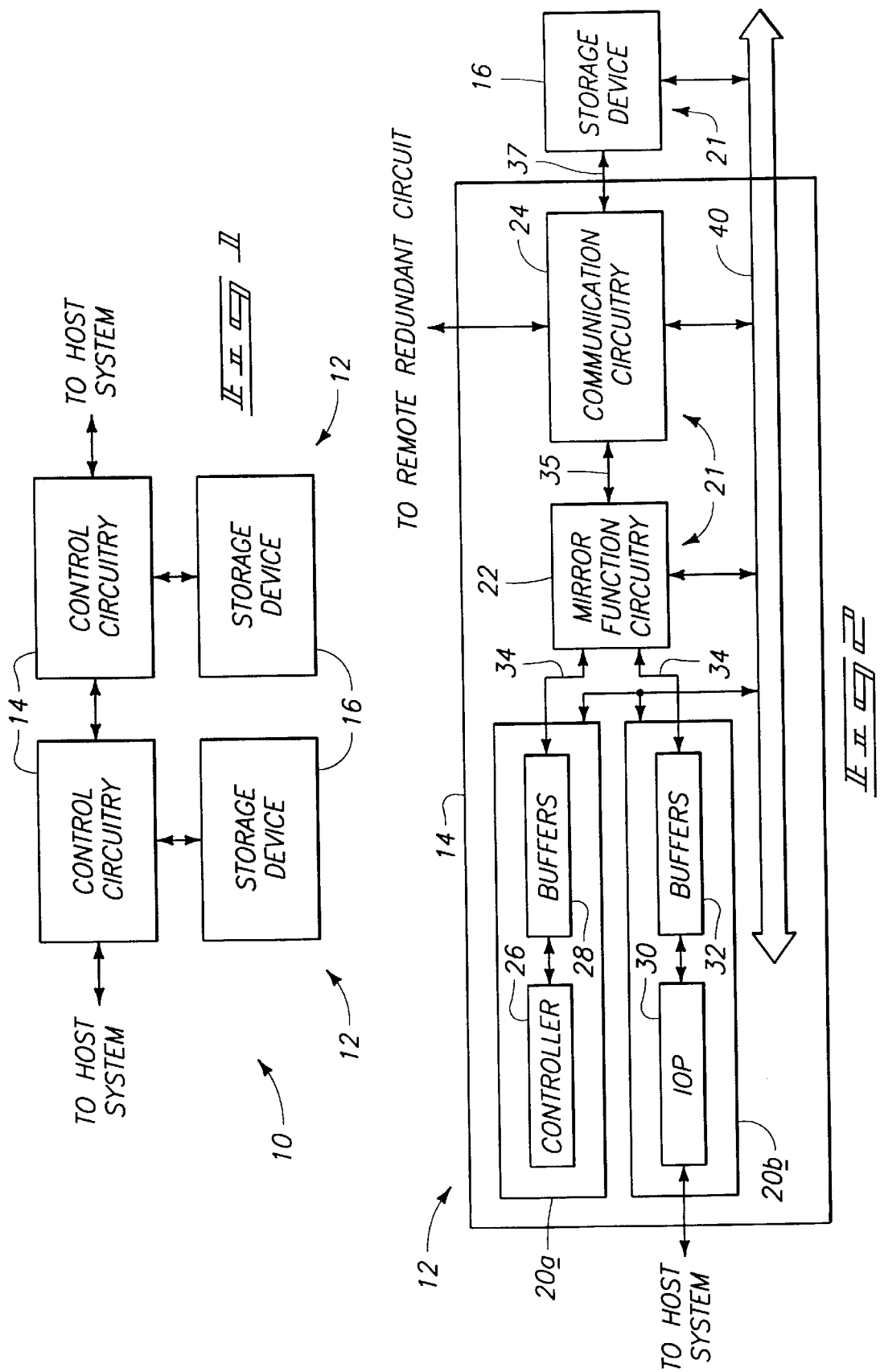

REDUNDANT DATA STORAGE SYSTEMS AND METHODS OF OPERATING A REDUNDANT DATA STORAGE SYSTEM

FIELD OF THE INVENTION

The present invention provides redundant data storage systems and methods of operating redundant data storage systems.

BACKGROUND OF THE INVENTION

One complicating factor in conventional computer electronics is the increasing use of parallel operations. Further, transaction operations (e.g., read and write memory operations to a large DRAM array) are frequently reordered so as to present a minimal latency to transaction masters (e.g., a processor waiting for read data from DRAM).

For a given RAID subsystem application, there are certain commitments the subsystem typically makes to a coupled host system before the aggregate system can operate properly. Consider a case when the host system writes data to the RAID subsystem. The RAID subsystem stores the data in a fault tolerant condition. For the sake of performance, the RAID subsystem will store the host data into a low latency, high bandwidth storage device. This device is commonly implemented using DRAM technology. Only after the data has been safely stored can the RAID subsystem return a "good status" to the host. However, the longer the RAID subsystem waits to return "good status" to the host, the worse the performance will be. On the other hand, a premature "good status" may result in data loss if an interim failure is able to cause a situation where all of the data is lost.

The processors in a RAID subsystem are usually responsible for providing the "good status" message to the host system. In order to achieve this function, the processor determines that the data written by the host is completely safe from failure before it can make the "good status" commitment to the host system.

The processor will originate several read and write transactions in the system for each host operation. In some configurations, transactions may be reordered at some point along the data path to minimize the time a processor spends handling the host operation. In such instances, some transactions are set aside while higher priority transactions are completed. An example of this would be when a memory write transaction to some control structure is stored in a write buffer. The write buffer operates as a transaction processing device. A subsequent read request generally has a higher priority since components (such as processors) are susceptible to data starvation. Depending on the design characteristics, this could delay the processing of a transaction indefinitely. Thus, the control structure in main memory will be stale until the write buffer is flushed.

Consider again the case where the host writes data to the RAID subsystem. One of the issues for processors in a RAID subsystem is their need to know when the host data is stored redundantly and is safe from failure. Combining the technology that allows for reordered parallel operations and the need to have a point of commitment directly conflict. For example, if the data that has been written from the host is sitting inside a write buffer for a relatively long period of time and the processor sends "good status" before the data in the write buffer is flushed to the redundant storage component (DRAM), then the commitment could be presented to the host before the data is transferred to DRAM. The host will continue its operation knowing the RAID subsystem will not lose the data. However, without the present invention, data loss may occur if a failure disables the flushing of the data in the write buffer. The data loss scenario is as simple as finding a parity corruption as the data is drained from the write buffer.

It follows that a write buffer may hold data for a period of time that allows ill-advised commitments from the RAID subsystem including indicating "good status" before the data is actually redundantly stored. Reordering and parallel paths are good for performance, but bad for proper operations in conventional RAID subsystems.

Accordingly, there exists a need to provide improved data storage systems and methods which utilize the benefits of parallel paths without compromising the integrity of redundantly stored data.

SUMMARY OF THE INVENTION

The invention provides redundant data storage systems and methods of operating redundant data storage systems.

In one aspect of the invention, a redundant data storage system comprises: a plurality of storage devices configured to redundantly store digital data; a plurality of transaction originating devices configured to originate a plurality of transactions to control operations of the storage devices; a plurality of parallel data buses configured to communicate data relative to the respective transaction originating devices; and a plurality of transaction processing devices coupled with the parallel data buses and configured to process the transactions in an order according to a transaction ordering protocol common to at least some of the transaction processing devices.

In another aspect of the invention, a method of operating a redundant data storage system comprises: redundantly storing data using a plurality of storage devices; originating a plurality of transactions to control operations of the storage devices using a plurality of transaction originating devices; communicating data with respect to the transaction originating devices using a plurality of parallel data buses; and processing the transactions using a plurality of processing transaction devices coupled with the parallel data buses, wherein the processing comprises processing the transactions in an order according to a transaction ordering protocol common to at least some of the processing transaction devices.

Another aspect provides a method of operating a redundant data storage system comprising: redundantly storing data using a plurality of storage devices of a redundant array of independent disks (RAID) storage system; originating a plurality of transactions to control operations of the storage devices using a plurality of transaction originating devices, the originating comprising originating a write transaction using an input/output processor of the storage system and originating a read transaction using a controller of the storage system; communicating data with respect to the transaction originating devices using a plurality of parallel data buses coupled with respective ones of the processor and the controller; and processing the transactions using a plurality of processing transaction devices coupled with the parallel data buses, wherein the processing comprises processing the transactions in an order according to a transaction ordering protocol common to at least some of the processing transaction devices which defines that the write transaction from the input/output processor precedes the read transaction from the controller.

Other features and advantages of the invention will become apparent to those of ordinary skill in the art upon review of the following detailed description, claims, and drawings.

DESCRIPTION OF THE DRAWINGS

FIG. 1 is a functional block diagram of an exemplary redundant data storage system.

FIG. 2 is a functional block diagram of an exemplary redundant circuit of the storage system of FIG. 1.

DETAILED DESCRIPTION OF THE INVENTION

Figure 3:
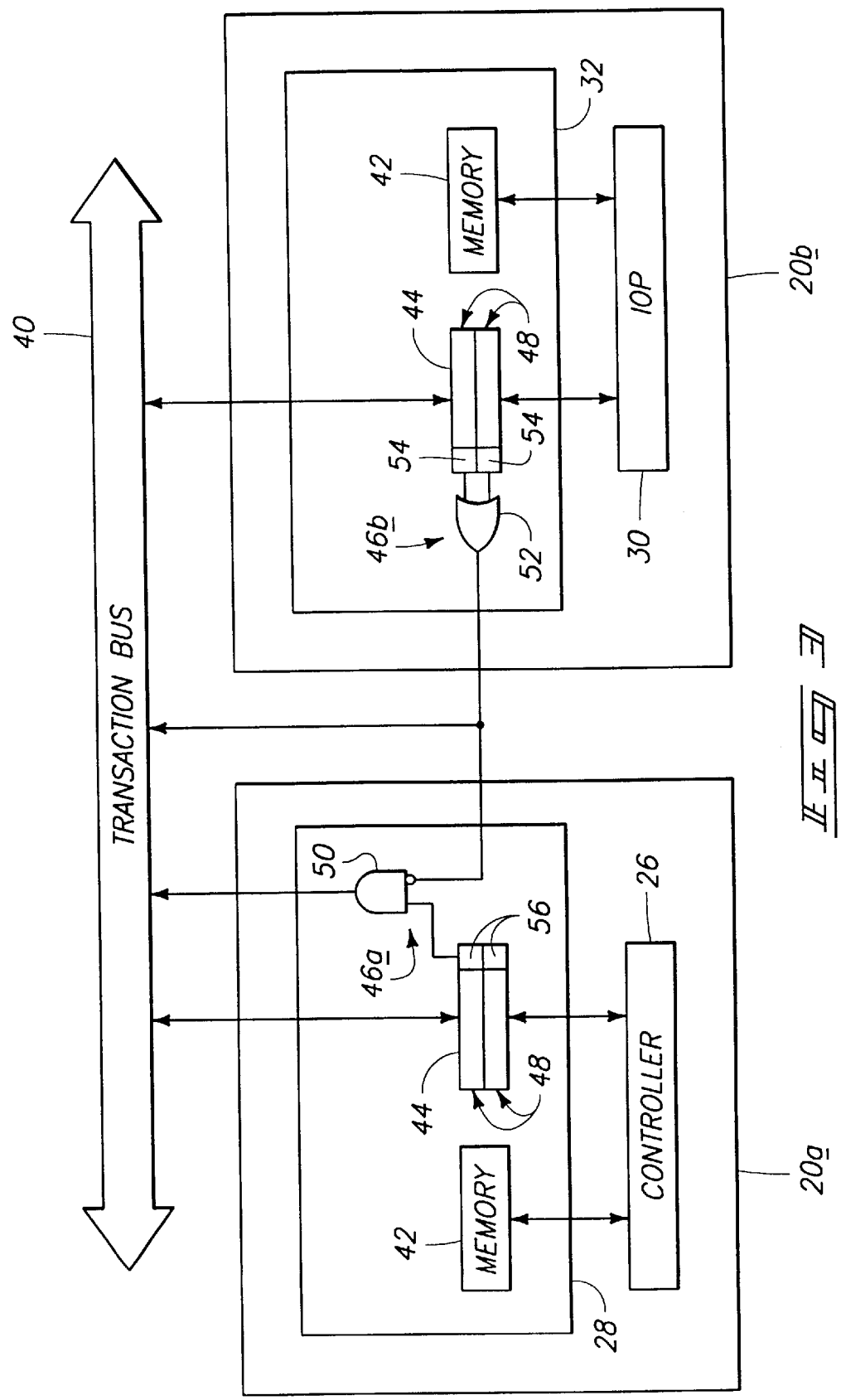
FIG. 3 is a functional block diagram of an exemplary transaction originating device and transaction bus of the redundant circuit of FIG. 2.

Referring to FIG. 1, exemplary components of a redundant data storage system 10 are shown. Storage system 10 includes plural redundant circuits 12 in the described embodiment. Individual redundant circuits 12 include control circuitry 14 and a local storage device 16. As used herein, "local" refers to a currently described redundant circuit or components within the currently described redundant circuit, and "remote" refers to the other redundant circuit or components within the other redundant circuit.

Redundant circuits 12 are provided within storage system 10 to provide at least some functionality in case of failure of one or more components within one or more of redundant circuits 12. During typical operations, control circuitry 14 implements communications with a host system, such as a personal computer, workstation, etc. In some configurations, only one of redundant circuits 12 is coupled with a host system. Control circuits 14 additionally implement read and write operations of data relative to one or more of storage devices 16 of redundant circuits 12.

In the described embodiment, storage devices 16 individually include memory and hard disks (not shown) of a redundant array of independent disks (RAID) storage system. The described storage system 10 is operable to store digital data. Storage system 10 is implemented in other configurations according to other aspects of the present invention.

Referring to FIG. 2, additional details of a single exemplary redundant circuit 12 are shown. In the depicted exemplary embodiment, redundant circuit 12 includes plural transaction originating devices 20a, 20b and a plurality of transaction processing devices 21. In the illustrated arrangement of redundant circuit 12, such transaction processing devices 21 include mirror function circuitry 22, communication circuitry 24 and local storage device 16.

Transaction originating device 20a includes a controller 26 coupled with buffers 28 in the depicted embodiment. Transaction originating device 20b includes an input/output processor (IOP) 30 coupled with buffers 32. In one configuration, buffers 28, 32 individually include read and write buffers. Such buffers 28, 32 temporarily store transactions and data being applied to or received from respective controller 26 and input/output processor 30.

Transactions are originated from devices 20a, 20b to control operations within storage system 10. For example, exemplary transactions include read operations and write operations of digital data with respect to redundant storage devices 16. Transaction processing devices 21 process and execute the transactions originated from devices 20a, 20b to effect the read and write operations.

Controller 26 controls operations of the respective redundant circuit 12. In the illustrated exemplary embodiment, controller 26 is implemented as a microprocessor operable to execute a plurality of software or firmware instructions. Such executable instructions may be stored internally within controller 26 or provided in an external storage device such as read only memory (ROM), not shown.

Input/output processor 30 interfaces with a host system, such as a personal computer, workstation, network, etc. and implements communications of data and control signals with respect thereto.

Mirror function circuitry 22 implements and coordinates read and write operations of digital data with respect to storage devices 16 within both redundant circuits 12 according to one operational aspect of the invention. Further details of mirror function circuitry are described below.

Communication circuitry 24 is coupled with local and remote storage devices 16 of redundant circuits 12. In the described embodiment, communication circuitry 24 implements communications of data and transactions to storage device 16 local to communication circuitry 24 as well as the remote storage device 16 of the other redundant circuit 12.

Individual storage devices 16 include circuitry to receive and forward transactions and to store data for subsequent access. For example, in one configuration, a given storage device 16 includes one or more controller to process transactions such as read and write operations with respect to storage circuitry including memory, hard disk drives, etc.

As previously mentioned, transaction originating devices 20a, 20b are operable to individually originate transactions to control operations of storage devices 16. A transaction bus 40 is provided to couple transaction originating devices 20a, 20b and transaction processing devices 21. Such transaction bus 40 operates to communicate transactions between the appropriate respective devices 20a, 20b, 21. Further details regarding an exemplary configuration of transaction bus 40 are discussed below.

Additionally, a plurality of data buses 34 are provided to couple transaction originating devices 20a, 20b with mirror function circuitry 22 in the described configuration. A data bus 35 couples mirror function circuitry 22 and communication circuitry 24. Another data bus 37 couples communication circuitry 24 and storage device 16. Parallel data buses 34 and buses 35, 37 communicate data intermediate transaction originating devices 20a, 20b and storage devices 16 via mirror function circuitry 22 and communication circuitry 24.

Transaction originating devices 20a, 20b and transaction processing devices 21 including mirror function circuitry 22, communication circuitry 24 and storage device 16 are individually coupled to communicate transactions using transaction bus 40. Such transaction processing devices 21 are operable to process the transactions in an order according to a transaction ordering protocol common to at least some of such transaction processing devices 21. Further details of the transaction ordering protocol according to one aspect of the present invention are described below.

An exemplary transaction ordering protocol defines the order for processing of transactions corresponding to the transaction type. For example, the transaction ordering protocol defines that a given transaction type from a given one of transaction originating devices 20a, 20b proceeds another transaction type from another one of transaction originating devices 20a, 20b. In but one arrangement, the given transaction type is a write command from input/output processor 30 and the other transaction type is a read command from controller 26. Accordingly, transaction processing devices 21 process and execute pending write instructions relative to storage devices 16 from input/output processor 30 prior to processing and executing read operations of storage devices 16 from controller 26. Such assures that data believed to be written to storage devices 16 is properly stored in storage devices 16 prior to attempted access of such data by controller 26.

Additional aspects of the invention include provision of the transaction ordering protocol to plural transaction processing devices 21 using transaction bus 40 to maintain such desired processing order for transactions among plural devices 21. According to such aspects, the plural transaction processing devices 21 process the transactions according to the ordering protocol.

Referring to FIG. 3, communication of transactions within storage system 10 is described according to one exemplary aspect of the invention. FIG. 3 depicts transaction originating devices 20a, 20b coupled with transaction bus 40. The depicted configurations of buffers 28, 32 of transaction originating devices 20a, 20b individually include memory 42, a transaction queue 44, and respective logic circuitry 46a, 46b. Memory 42 may be implemented as static random access memory (SRAM). Memory 42 temporarily stores data which is retrieved from or written to storage devices 16. Memory 42 is coupled with respective data buses 34 shown in FIG. 2 to communicate the data with respect thereto.

In the depicted configuration, individual transaction queues 44 include two transaction storage positions or locations 48. Such transaction queues 44 individually include additional transaction storage positions 48 to store additional transactions according to other embodiments.

As shown in the described embodiment, logic circuits 46a, 46b are coupled with respective bit positions of the transaction storage positions 48 of transaction queue 44. For example, logic circuitry 46a includes an AND gate 50 and logic circuitry 46b includes an OR gate 52. OR gate 52 has inputs coupled with write bit positions 54 of transaction storage positions 48 of transaction queue 44 within transaction originating device 20b. AND gate 50 is coupled with both read bit positions 56 of transaction storage positions 48 within transaction queue 44 of transaction originating device 20a.

In addition, AND gate 50 is also coupled with the output of OR gate 52. Such logic circuitry 46a, 46b implements the transaction ordering protocol according to one aspect of the present invention wherein pending write transactions within transaction queue 44 of transaction originating device 20b precede pending read transactions within transaction queue 44 of transaction originating device 20a. Using logic circuits 46a, 46b, transaction originating device 20a knows the status of transactions of transaction originating device 20b (e.g., whether a write transaction in transaction queue 44 has been posted to transaction bus 40. Although not shown, controller 26 can access such logic circuits 46a, 46b to determine the status of pending transactions.

Logic circuits 46a, 46b provide transaction originating devices 20a, 20b in a configuration to communicate transactions to transaction bus 40 and transaction processing devices 21 according to one possible implementation of the transaction ordering protocol (e.g., write transactions from device 20b precede read transactions from device 20a in the described exemplary configuration). Different ordering of transactions is provided in other embodiments not shown.

Following the application of signals from logic circuits 46a, 46b to transaction bus 40, the respective transactions within transaction queues 44 are forwarded to transaction bus 40. Such transactions individually include length and address information regarding data stored with memory 42 which corresponds to the respective transactions. More specifically, individual transactions include information regarding originating address (e.g., device 20a or device 20b) and destination address (e.g., of proper device 21) as well as identification information of the length of the associated data and identification information of the type of transaction (e.g., write request, mirrored read compare request, read local only request, etc.).

In the illustrated configuration of storage system 10, control of the order of application of transactions to transaction bus 40 controls the order of processing of such transactions by transaction processing devices 21. Transaction processing devices 21 process received transactions according to the order of reception of the transactions from transaction originating devices 20a, 20b in the described exemplary operation of storage system 10 described further below.

Figure 4:
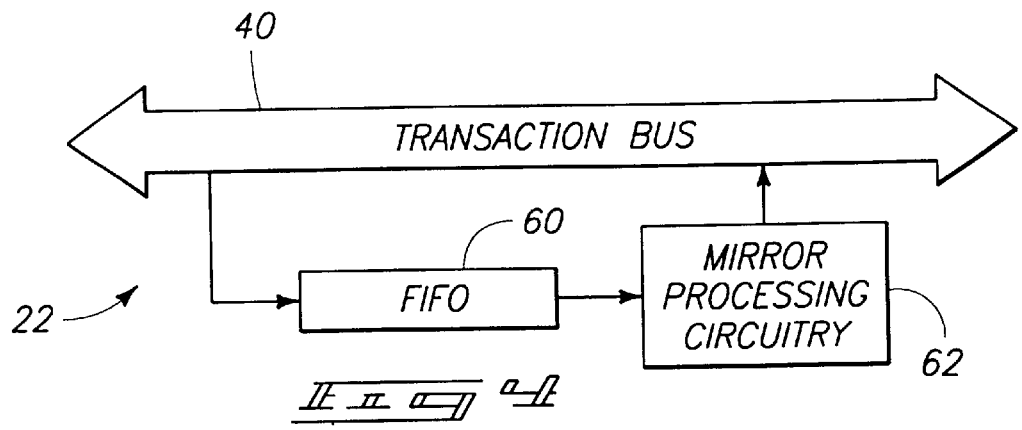
FIG. 4 is a functional block diagram of exemplary mirror function circuitry of FIG. 2.
Figure 5:
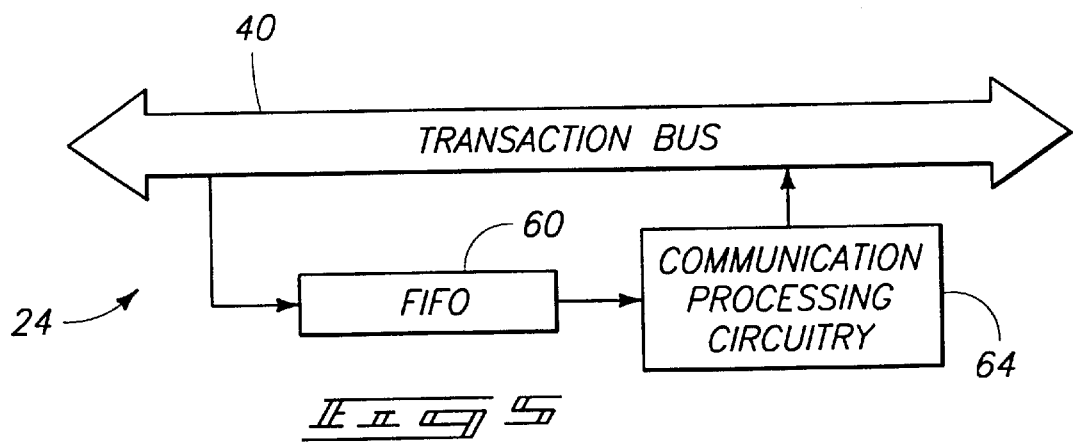
FIG. 5 is a functional block diagram of exemplary communication circuitry of FIG. 2.
Figure 6:
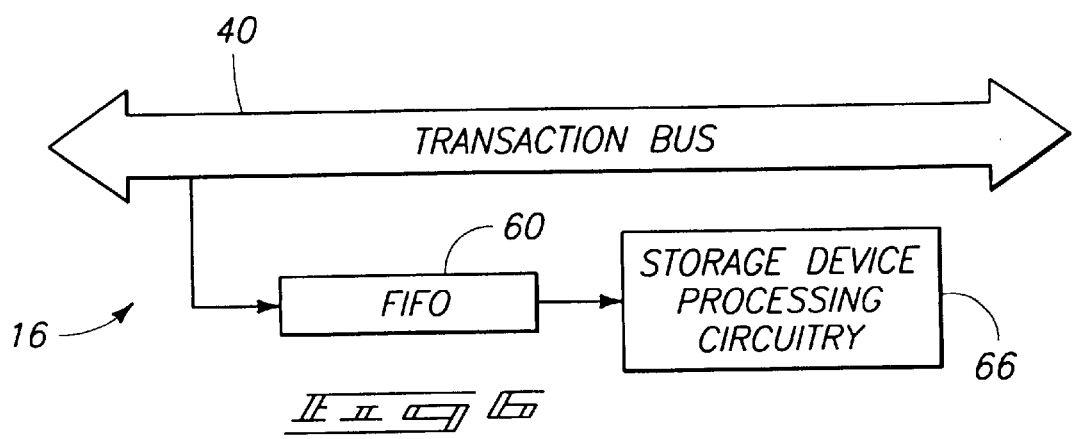
FIG. 6 is a functional block diagram of an exemplary storage device of FIG. 2.

Referring to FIG. 4–FIG. 6, exemplary configurations of transaction processing devices 21 including mirror function circuitry 22, communication circuitry 24 and storage device 16, respectively, are illustrated. FIG. 4–FIG. 6 illustrate exemplary components of transaction processing devices 21 arranged to receive and order transactions to be processed. Other configurations of the respective transaction processing devices 21 are possible.

Individual transaction processing devices 21 see all originated transactions upon transaction bus 40 in the described embodiment, but only receive those properly addressed to the respective transaction processing devices 21.

Referring initially to FIG. 4, exemplary mirror function circuitry 22 is shown. FIG. 4 depicts a first in first out (FIFO) device 60 and mirror processing circuitry 62 coupled with transaction bus 40. Transactions provided to transaction bus 40 by devices 20a, 20b are communicated to the respective transaction processing devices 21 via addressing.

FIFO 60 of mirror function circuitry 22 receives appropriately addressed transactions from transaction bus 40 and arranges such transactions according to the order of reception within FIFO 60 from transaction bus 40. Mirror processing circuitry 62 of mirror function circuitry 22 extracts transactions from FIFO 60, performs any required processing upon the transactions to implement mirroring functionality, and reposts the transactions to transaction bus 40. Such reposted transactions to transaction bus 40 may include updated information such as a new originating address (e.g., circuitry 22) and new destination address (e.g., circuitry 24).

In one exemplary arrangement, mirror processing circuitry 62 implements communication of data intermediate transaction originating devices 20a, 20b and communication circuitry 24. An exemplary operation of mirror processing circuitry 62 includes comparing read data from the plural storage devices 16 to note any discrepancies, in addition to interpreting received transactions. Other operations of mirror processing circuitry 62 are possible.

Mirror processing circuitry 62 is coupled with plural data buffers (not shown). Such data buffers are coupled with data buses 34, 35 of FIG. 2, and communicate data with respect to data buses 34, 35. Mirror processing circuitry 62 selectively extracts data from the data buffers responsive to the respective transactions to implement any desired processing.

Referring now to FIG. 5, exemplary communication circuitry 24 is shown. The depicted communication circuitry 24 includes a first in first out (FIFO) device 60 and communication processing circuitry 64 coupled with transaction bus 40. FIFO 60 of communication circuitry 24 receives appropriately addressed transactions from transaction bus 40 and arranges such transactions according to the order of reception within FIFO 60 from transaction bus 40. Communication processing circuitry 64 extracts transactions from FIFO 60, performs any required processing upon the transactions to implement communication functionality, and reposts the transactions to transaction bus 40. Such reposted transactions to transaction bus 40 may include updated information such as a new originating address and new destination address.

In one exemplary arrangement, communication circuitry 64 implements communication and coordination of data with respect to the local and remote storage devices 16. Other operations of communication processing circuitry 64 are possible.

Communication processing circuitry 64 is coupled with plural data buffers (not shown). Such data buffers are coupled with data buses 35, 37, and communicate data with respect to data buses 35, 37. Communication processing circuitry 64 selectively extracts data from the data buffers responsive to the respective transactions to implement the desired processing and communications.

Referring now to FIG. 6, an exemplary storage device 16 is shown. The depicted storage device 16 includes a first in first out (FIFO) device 60 and storage device processing circuitry 66 coupled with transaction bus 40. FIFO 60 of storage device circuitry 16 receives appropriately addressed transactions from transaction bus 40 and arranges such transactions according to the order of reception within FIFO 60 from transaction bus 40. Storage device processing circuitry 66 extracts transactions from FIFO 60, and performs any required processing upon the transactions to implement storage functionality (e.g., read and write operations).

In one exemplary arrangement, storage device processing circuitry 66 implements control of data access with respect to the local storage devices 16. For example, storage device processing circuitry 66 can comprise DRAM control circuitry and hard disk drives coupled with respective DRAM and hard disks. Other implementations of storage device processing circuitry 66 are possible. Storage device processing circuitry 66 selectively reads and writes data with respect to the DRAM and hard disks responsive to respective transactions. Data bus 37 communicates data relative to the DRAM and hard disks.

The protection sought is not to be limited to the disclosed embodiments, which are given by way of example only, but instead is to be limited only by the scope of the appended claims.

What is claimed is:

1. A redundant data storage system comprising:
a plurality of storage devices configured to redundantly store digital data;
a plurality of transaction originating devices configured to originate a plurality of transactions to control operations of the storage devices;
a plurality of parallel data buses configured to communicate data relative to the respective transaction originating devices; and
a plurality of transaction processing devices coupled with the parallel data buses and configured to process the transactions in an order according to a transaction ordering protocol common to at least some of the transaction processing devices.

2. The system in accordance with claim 1 wherein the transaction ordering protocol defines the order corresponding to the type of the transactions.

3. The system in accordance with claim 1 wherein the transaction originating devices comprise logic circuitry configured to implement the transaction ordering protocol.

4. The system in accordance with claim 1 wherein the transaction originating devices are configured to communicate the transactions to the transaction processing devices according to the transaction ordering protocol.

5. The system in accordance with claim 4 wherein the transaction processing devices are configured to process the transactions according to the order of reception of the transactions from the transaction originating devices.

6. The system in accordance with claim 1 wherein the transaction ordering protocol defines that a given transaction type from a given one of the transaction originating devices precedes another transaction type from another one of the transaction originating devices.

7. The system in accordance with claim 6 wherein the given transaction type comprises a write command from the given transaction originating device comprising an input/output processor and the another transaction type comprises a read command from the another transaction originating device comprising a controller.

8. The system in accordance with claim 1 wherein the plural transaction processing devices are configured to process a given one of the transactions according to the transaction ordering protocol.

9. The system in accordance with claim 1 wherein the transaction ordering protocol defines that pending transactions comprising write commands precede pending transactions comprising read commands.

10. The system in accordance with claim 1 wherein the storage devices individually comprise at least one of memory and a plurality of disks of a RAID storage system.

11. A method of operating a redundant data storage system comprising:
redundantly storing data using a plurality of storage devices;
originating a plurality of transactions to control operations of the storage devices using a plurality of transaction originating devices;
communicating data with respect to the transaction originating devices using a plurality of parallel data buses; and
processing the transactions using a plurality of processing transaction devices coupled with the parallel data buses, wherein the processing comprises processing the transactions in an order according to a transaction ordering protocol common to at least some of the processing transaction devices.

12. The method in accordance with claim 11 wherein the processing comprises processing according to the transaction ordering protocol which defines the order corresponding to the type of the transactions.

13. The method in accordance with claim 11 further comprising communicating the transactions to the transaction processing devices according to the transaction ordering protocol.

14. The method in accordance with claim 13 further comprising receiving the transactions within the transaction processing devices, and the processing comprises processing the transactions according to the order of reception of the transactions from the transaction originating devices.

15. The method in accordance with claim 11 wherein the processing comprises processing according to the transaction ordering protocol which defines that a given transaction type from a given one of the transaction originating devices precedes another transaction type from another one of the transaction originating devices.

16. The method in accordance with claim 15 wherein the given transaction type comprises a write command from the given transaction originating device comprising an input/output processor and the another transaction type comprises a read command from the another transaction originating device comprising a controller.

17. The method in accordance with claim 11 wherein the processing comprises processing a given one of the transactions according to the transaction ordering protocol using plural transaction processing devices.

18. The method in accordance with claim 11 wherein the processing comprises processing pending transactions comprising write commands before processing pending transactions comprising read commands.

19. The method in accordance with claim 11 wherein the redundantly storing comprises storing using the storage devices individually comprising at least one of memory and a plurality of disks of a RAID storage system.

20. A method of operating a redundant data storage system comprising:

redundantly storing data using a plurality of storage devices of a redundant array of independent disks (RAID) storage system;

originating a plurality of transactions to control operations of the storage devices using a plurality of transaction originating devices, the originating comprising originating a write transaction using an input/output processor of the storage system and originating a read transaction using a controller of the storage system;

communicating data with respect to the transaction originating devices using a plurality of parallel data buses coupled with respective ones of the processor and the controller; and processing the transactions using a plurality of processing transaction devices coupled with the parallel data buses, wherein the processing comprises processing the transactions in an order according to a transaction ordering protocol common to at least some of the processing transaction devices which defines that the write transaction from the input/output processor precedes the read transaction from the controller.

* * * * *